(12) United States Patent
Zucker

(10) Patent No.: US 6,911,077 B2
(45) Date of Patent: Jun. 28, 2005

(54) FIBER REINFORCED CEMENTITIOUS MATERIAL

(75) Inventor: Jerry Zucker, Charleston, SC (US)

(73) Assignee: The InterTech Group, Inc., North Charleston, SC (US)

( * ) Notice: Subject to any disclaimer, the term of this patent is extended or adjusted under 35 U.S.C. 154(b) by 94 days.

(21) Appl. No.: 10/666,452

(22) Filed: Sep. 19, 2003

(65) Prior Publication Data

US 2004/0132868 A1 Jul. 8, 2004

Related U.S. Application Data

(60) Provisional application No. 60/413,326, filed on Sep. 25, 2002.

(51) Int. Cl.[7] .............................................. C04B 14/38
(52) U.S. Cl. ...................... 106/644; 106/724; 106/733
(58) Field of Search ................................ 106/644, 724, 106/733

(56) References Cited

U.S. PATENT DOCUMENTS

| | | |
|---|---|---|
| 4,105,739 A | 8/1978 | Dave |
| 4,133,928 A | 1/1979 | Riley et al. |
| 4,257,993 A | 3/1981 | Schemel |
| 4,314,003 A | 2/1982 | Curnow et al. |
| 4,910,076 A | 3/1990 | Ando et al. |
| 4,916,012 A | 4/1990 | Sawanobori et al. |
| 5,032,181 A | 7/1991 | Chung |
| 5,298,071 A | 3/1994 | Vondran |
| 6,258,159 B1 | 7/2001 | Pyle |
| 6,423,134 B1 | 7/2002 | Trottier et al. |

OTHER PUBLICATIONS

Ken–React Reference Manual, Kenrich Petrochemicals, Inc. (Bayonne, NJ), (1993).

Banthia, et al, "Bond–Slip Characteristics of Steel Fibers in HRM Modified Cement–Based Matrices," Cement and Concrete Research, Elsevier Science Ltd., vol. 26 (No. 5), p. 657–662, (1996).

*Primary Examiner*—Paul Marcantoni
(74) *Attorney, Agent, or Firm*—Robert H. Hammer, III, P.C.

(57) ABSTRACT

A fiber reinforced cementitious material and the fiber used therein are disclosed. The fiber reinforced cementitious material includes a conventional cementitious material and less than 5 pounds per cubic yard of the cementitious material of fibers dispersed therein. The fibers are made of a mixture of a thermoplastic polymer and an organometal compound wherein the metal of the compound is selected from the group consisting of Ti, Si, Zr, Al, and combinations thereof, and the organometal compound comprising less than 10% by weight of said fibers.

12 Claims, 2 Drawing Sheets

FIBER REINFORCED CEMENTITIOUS MATERIAL

CROSS-REFERENCE TO RELATED APPLICATION

This application claims the benefit of Provisional Application No. 60/413,326 filed Sep. 25, 2002.

FIELD OF THE INVENTION

The present invention is directed to a fiber reinforced cementitious material and the fibers used in that cementitious material.

BACKGROUND OF THE INVENTION

In general, it is known that fibers can be used to increase the strength of cementitious materials and gypsum products. See U.S. Pat. Nos. 4,105,739 and 4,133,928. Moreover, it is known that if the adhesion between the cementitious material and the reinforcing fibers is increased, that it can have a positive impact on the strength of the material. For example, in U.S. Pat. No. 4,257,993, glass fibers are coated with a resin or sprinkled with quartz sand to increase the adhesion. In U.S. Pat. No. 4,314,003, carbon fibers are coated with an epoxy resin having a fatty acid amine hardener. In U.S. Pat. No. 4,910,076, the fibers are coated with a reactive copolymer latex and a synthetic resin. In U.S. Pat. No. 4,916,012, carbon fibers are coated with epoxy resins and rubber latex. In U.S. Pat. No. 5,032,181, carbon fibers are coated with organometallic-based coatings and latex coatings are disclosed as promoting bonding between the carbon fibers and the cement matrix.

While the foregoing has improved the strength of cementitious materials, further improvement is still sought.

SUMMARY OF THE INVENTION

A fiber reinforced cementitious material and the fiber used therein are disclosed. The fiber reinforced cementitious material includes a conventional cementitious material and less than 5 pounds per cubic yard of the cementitious material of fibers dispersed therein. The fibers are made of a mixture of a thermoplastic polymer and an organometal compound wherein the metal of the compound is selected from the group consisting of Ti, Si, Zr, Al, and combinations thereof, and the organometal compound comprising less than 10% by weight of said fibers.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
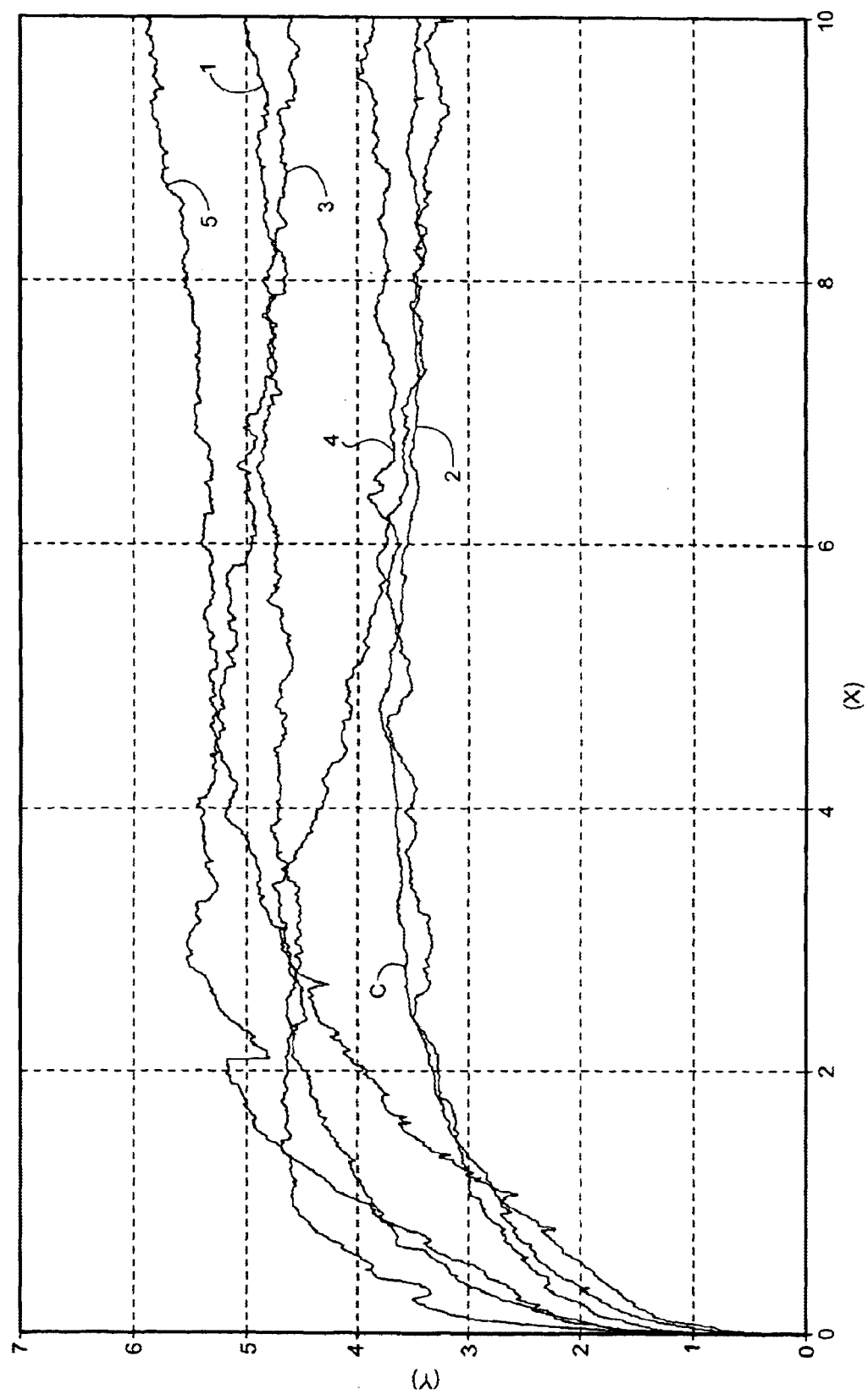
FIG. 1 is a graph illustrating load (N), y axis, as a function of averaged load-crack opening displacement, x axis.

A conventional cementitious material refers to any inorganic cement based, hardenable material including, but not limited to concrete, gunite, masonary cement (mortar), block, wall board (gypsum), and the like.

The fibers may be mixed into the cementitious material so that they are randomly dispersed therein, or they may be aligned within the material whereby they are better able to absorb structural loads. The fibers may comprise less than or equal to about 5 pounds, preferably less than or equal to about 3 pounds and most preferably 1–2 pounds, per cubic yard of the cementitious material. The fibers are preferably short cut fibers (or chopped fibers or staple fibers; typically 0.5 to 3 inches (10 to 75 mm)), but may be in other forms as well. Those other forms include: filaments, woven or knitted fabrics, and nonwoven fabrics.

Fibers are made of a mixture of a thermoplastic polymer and an organometal compound. Preferably, the organometal compound is mixed into the thermoplastic material prior to fiber formation, however, the organometal compound may be coated onto the thermoplastic fiber after its formation. Preferably, the organometal compound is less than or equal to 10% by weight of the fiber, most preferably, less than or equal to 5% by weight of the fiber. Preferably, a silane is used in all fiber formulations. The most preferred fiber formulations contain a silane and a titanate, or a silane and a zirconate. In one embodiment, the silane may be coated on to the fiber and the other organometal compounds are mixed into the thermoplastic polymer.

In fiber formation, for example, by a melt spinning process or a slit film extrusion process, the organometal compound may be added directly to the thermoplastic melt, added in solution or mixture with a diluent, or added as a concentrate in the thermoplastic resin (masterbatching). Masterbatching is preferred. If a diluent is used, any suitable material may be used, for example, mineral oil. When adding the organometal compound, which is typically a liquid, it may be beneficial for the uniform dispersion of the compound in the thermoplastic to add the compound to a carrier (e.g., fumed silica or Accurel, a microporous product of Membrana GmbH, Wuppertal, Germany) so that the compound becomes a powder. Whichever method is used, uniform dispersion along the length of the fiber is essential. If possible, a higher concentration of the organometal compound is preferred at the fiber's surface than at its core, that may be obtained by bicomponent extrusion.

Alternatively, conventional reinforcing elements used in cemetitious materials, e.g., rebar, steel fibers, wire mesh, wire rope, and the like, may be coated with the mixture of thermplastic polymer and organometal compound. The coating should be sufficiently thick that it will uniformly coat the surface and will not delaminate therefrom under normal field conditions. Also, structural fiber and synthetic rebar, wire mesh, or rope, may be made of the mixture or coated therewith.

The thermoplastic polymer of the fiber may be selected from the group consisting of polyolefins, polyesters, nylons, and acrylics. The preferred polyolefins include polyethylene and polypropylene. The most preferred thermoplastic polymer is polypropylene.

The organometal compound is used to facilitate or improve interfacial bonding between the fiber and the cementitious material. It is believed that the addition of the organometal compound to the thermoplastic fiber will exhibit higher flexural strength, better multiple cracking capabilities, lower critical fiber volume fractions, and greater fracture toughness values, and will decrease the plastic shrinkage of the cementitious material. The organometal compounds include compounds wherein the metal is selected from the group consisting of Ti, Si, Zr, Al, and combinations thereof. Preferably, the organometal compounds may be selected from the group consisting of titanates, silanes, zirconates, aluminates, and combinations thereof. Additional information about organometal compounds such as titanates, zirconates, and aluminates may be found in the *Ken-React® Reference Manual*, Kenrich Petrochemicals, Inc., Bayonne, N.J., (1993) incorporated herein by reference. When selecting the organometal compound, its hydrophilic nature should be considered. Organometals having a greater hydrophilictiy are preferred. Such organometal compounds are commercially available.

Titanates and zirconates are available from Kenrich Petrochemical, Inc. of Bayonne, N.J. Suitable titanates include: titanium IV 2-propanolato, tris isooctadecanoato-0; titanium IV bis 2-methyl-2-propenoato-0, isooctadecanoato-0 2-propanolato; titanium IV 2-propanoloato, tris (dodecyl)benzenesulfanato-0; titanium IV 2-propanolato, tris (dioctyl)phosphato-0; titanium IV (4-amino)benzene sulfonato-0, bis(dodecyl)benzene sulfonato-0, 2-propanolato; titanium IV 2,2(bis 2-propenolatomethyl) butanolato, tris (dioctyl) pryophosphate-0; titanium IV, tris(2 methyl)-2-propenoato-0, methoxydiglycolylato; titanium IV 2-propanolato, tris (dioctyl)pyrophosphato-0; titanium IV, tris(2-propenoato-0), methoxydiglycolyloto; titanium IV 2-propanolato, tris(3,6-diaza)hexanolato; titanium IV bis[4-(2-phenyl)2-propyl-2] phenolato, oxoethylenediolato; titanium IV bis(dioctyl) pyrophosphato-0, oxoethylenediolato, (adduct), (dioctyl) (hydrogen)phosphite-0; titanium IV oxoethylenediolato, tris (2-methyl)-2-propenoato-0; titanium IV bis(butyl, methyl) pyrophosphato-0, oxoethylene-diolato, (adduct), bis (dioctyl)hydrogen phosphite; titanium IV bis(dioctyl) phosphato-0, ethylenediolato; titanium IV bis(dioctyl) pyrophosphato-0, ethylenediolato (adduct), bis(dioctyl) hydrogen phosphite; titanium IV bis(butyl, methyl) pyrophosphato-0, ethylenediolato, (adduct), bis(dioctyl) hydrogen phosphite; titanium IV bis(dioctyl)pyrophosphato-0, oxoethylenediolato, (adduct) 2 moles of 2-N,N-dimethylamino-2-methylpropanol; titanium IV bis(butyl methyl)pyrophosphato-0, (adduct) 2 moles 2-N,N-dimethylamino-2-methylpropanol; titanium IV ethylenediolato, bis(dioctyl)pyrophosphato-0, bis(triethyl) amine salt; titanium IV ethylenediolato bis(dioctyl) pyrophosphato-0, bis(dialkyl)amino alkyl-2-methyl propenoate; titanium IV bis(dioctyl)pyrophosphato-0, ethylenediolato, (adduct) 2 moles of acrylato-0 active amine; titanium IV bis(dioctyl) pyrophosphato-0, ethylenediolato, (adduct) 2 moles of 2-methylpropenoamido-N active amine; titanium IV bis (butyl, methyl)pyrophosphato, ethylenediolato, bis(dialkyl) amino alkyl acrylate salt; titanium IV (bis-2-propenolatomethyl)-1-butanolato, bis(dioctyl) pyrophosphato-0, (adduct) 3 moles N,N-dimethylamino-alkyl propenoamide; titanium IV tetrakis 2-propanolato, adduct 2 moles (dioctyl) hydrogen phosphate; titanium IV tetrakis octanolato adduct 2 moles (di-tridecyl) hydrogen phosphite; titanium IV tetrakis(bis 2-propenolato methyl)-1-butanolato adduct 2 moles (di-tridecyl)hydrogen phosphite; titanium IV 2,2(bis 2-propenolatomethyl) butanolato, tris neodecanoato-0; titanium IV 2,2(bis 2-propenolatomethyl) butanolato, tris (dodecyl) benzenesulfonato-0; titanium IV 2,2(bis 2-propenolatomethyl) butanolato, tris (dioctyl) phosphato-0; titanium IV 2,2(bis 2-propenolatomethyl) butanolato, tris (dioctyl) pyrophosphato-0; titanium IV 2,2(bis 2-propenolatomethyl) butanolato, tris (2-ethylenediamino) ethylato; titanium IV 2,2(bis 2-propenolatomethyl) butanolato, tris (3-amino) phenylato; titanium IV 2,2(bis 2-propenolatomethyl) butanolato, tris (6-hydroxy) hexanoato-0; titanium IV bis octanolato, cyclo(dioctyl) pyrophosphato-0,0; titanium IV bis cyclo(dioctyl) pyrophosphato-0,0; titanium IV neoalkanolato tris (diisooctyl) pyrophosato-o (adduct)N-substituted -methacrylamide; titanium IV neoalkanolato, tris (dodecylphenyl) sulfanato.

Suitable zirconates include: zirconium IV 2,2-dimethyl 1,3 propanediolato, bis (dioctyl) pyrophosphato-0, (adduct) 2 moles N,N-dimethylamino-alkyl propenoamide; zirconium IV (2-ethyl, 2-propenolatomethyl) 1,3-propanediolato, cyclo bis 2-dimethylamino pyrophosphato-0,0 adduct with 2 moles of methanesulfonic acid; zirconium IV tetrakis 2,2 (bis-2 propenolatomethyl)butanolato, adduct with 2 moles of ditridecyl, hydrogen phosphite; zirconium IV 2-ethyl, 2-propenolatomethyl 1,3-propanediolato, cyclo di 2,2-(bis 2-propenolatomethyl) butanolato pyrophosphato-0,0; zirconium IV bis 2-ethylhexanolato, cyclo (di 2-ethylhexyl) pyrophosphato; zirconium IV 2,2(bis-2-propenolatomethyl) butanolato, tris neodecanolato-0; zirconium IV 2,2(bis-2-propenolatomethyl) butanolato, tris (dodecyl) benzenesulfonato-0; zirconium IV 2,2(bis-2-propenolatomethyl) butanolato, tris (dioctyl)phosphato-0; zirconium IV 2,2(bis-2-propenolatomethyl)butanolato, tris 2-methyl-2-propenoato-0; zirconium IV 2,2(bis-2-propenolatomethyl) butanolato, tris (dioctyl)pyrophosphato-0; zirconium IV 2,2(bis-2-propenolato)butanolato, tris 2-propenoato-0; zirconium IV 2,2(bis-2-propenolatomethyl) butanolato, tris (2-ethylenediamino) ethylato; zirconium IV bis 2,2(bis-2-propenolatomethyl) butanolato, bis (para amino benzoato-0); zirconium IV bis 2,2(bis-2-propenolatomethyl) butanolato, bis (3-mercapto) propionato-0; zirconium IV 1,1(bis-2-propenolatomethyl) butanolato, tris (2-amino) phenylato; zirconium IV 2,2-bis (2-propenolatomethyl) butanolato, cyclo di 2,2-(bis 2-propenolatomethyl)butanolato pyrophosphato-O,O ($C_{48}H_{84}O_{17}P_2Zr$).

Silanes are available from GE Silicones, Waterford, N.Y., and OSi Specialties, Crompton Corporation of Greenwich, Conn. Suitable silanes include: octyltriethoxysilane; methyltriethoxysilane; methyltrimethoxysilane; tris-[3-(trimethoxysilyl)propyl] isocyanurate; vinyltriethoxysilane; vinyltrimethoxysilane; vinyl-tris-(2-methoxyethoxy) silane; vinylmethyldimethoxysilane; gamma-methacryloxypropyltrimethoxysilane; beta-(3,4-epoxycyclohexyl)ethyltrimethoxysilane; gamma-glycidoxypropyltrimethoxysilane; gamma-mercaptopropyltrimethoxysilane; polysulfide silane; bis-(triethoxysilylpropyl)tetrasulfide; bis-(triethoxysilylopropyl) disulfide; gamma-aminopropyltriethoxysilane (MW=221.3); gamma-aminopropyltriethoxysilane (technical grade) (MW=mixture); gamma-aminopropyltriethoxysilane (technical grade) (MW=221.3); gamma-aminopropylsilsesquioxane (aqueous solution) (MW=oligomer); modified aminoorganosilane; gamma-aminopropyltrimethoxysilane; N-beta-(aminoethyl)-gamma-aminopropyltrimethoxysilane; modified aminoorganosilane (40% in methanol); modified aminoorganosilane (50% in methanol); triaminofunctional silane; bis-(gamma-trimethoxysilylpropyl)amine; N-phenyl-gamma-aminopropyltrimethoxysilane; polyazamide silane (50% in methanol); N-beta-(aminoethyl)-gamma-aminopropylmethyldimethoxysilane; gamma-ureidopropyltrialkoxysilane (50% in methanol); gamma-ureidopropyltrimethoxysilane; and gamma-isocyanatopropyltriethoxysilane.

Aluminates are commercially available from Kenrich Petrochemical, Inc. of Bayonne, N.J. Suitable aluminates include: diisobutyl (oleyl) aceto acetyl aluminate and diisopropyl (oleyl) aceto acetyl aluminate.

EXAMPLES

In the following examples, polypropylene fiber containing an organometal compound were tested to determine the increase in bond strength over a control, polypropylene fiber without organometal compound. The following samples were prepared using a conventional masterbatching technique.

TABLE 1

| Sample | Ti (oz) | Si (oz) | Zr (oz) | PP Carrier (oz) | Masterbatch Total (oz) | PP (oz) | Total Weight (oz) |
|---|---|---|---|---|---|---|---|
| 1 | 0.96[1] | 9.60[2] | — | 21.44 | 32.00 | 288.00 | 320.00 |
| 2 | 1.92[3] | — | — | 30.08 | 32.00 | 288.00 | 320.00 |
| 3 | — | 9.60[2] | 1.28[4] | 21.12 | 32.00 | 288.00 | 320.00 |
| 4 | 0.48[1] | 9.60[2] | 0.48[4] | 21.44 | 32.00 | 288.00 | 320.00 |
| 5 | 1.28[5] | 9.60[2] | — | 21.12 | 32.00 | 288.00 | 320.00 |

[1]CAPOW L 38/H - titanium IV 2,2(bis 2-propenolatomethyl) butanolato, tris (dioctyl) pryophosphate-0 on hydrated amorphous silica.
[2]Silquest A 1100 - gamma-amino propyltriethoxysilane from GE Silicones, Waterford, NY.
[3]CAPOW L 38J/H - titanium IV neoalkanolato tris (diisooctyl) pyrophosato-o (adduct) N-substituted methacrylamide on silicon dioxide.
[4]CAPOW KZ TPP/H - zirconium IV 2,2-bis(2-propenolatomethyl) butanolato, cyclo di 2,2-(bis 2-propenolatomethyl)butanolato pyrophosphato-O,O ($C_{48}H_{84}O_{17}P_2Zr$) on silicon dioxide.
[5]CAPOW L09/H - titanium IV neoalkanolato, tris (dodecylphenyl) sulfanato on silicon dioxide.

A "pull-out" test was used to determine bond strength. The pull-out test and apparatus are described in Banthia, N. et al, "Bond-Slip Characteristics of Steel Fibers in HRM Modified Cement Matrices," *Cement and Concrete Research*, 26(5), 1996, pp. 651–662; and Banthia, N. et al, "Bond-Slip Mechanisms in steel Micro-Fiber Reinforced Cement Composites," *Materials Research Society Proceedings*, Vol. 370, pp. 539–543, 1995, both are incorporated herein by reference. The fibers were in the form of a roving with 41 individual strands braided together with a total equivalent bundle diameter of 50 μm. These fibers were embedded in a cementitious matrix (water/cement ratio of 0.5) 40 mm×20 mm×10 mm, with an artificial crack, formed by a plastic film. Fibers extended 5 mm into the matrix on one side of the crack and 20 mm on the other. Ten specimens of each sample were prepared and tested after an age of 1 day.

Figure 2:
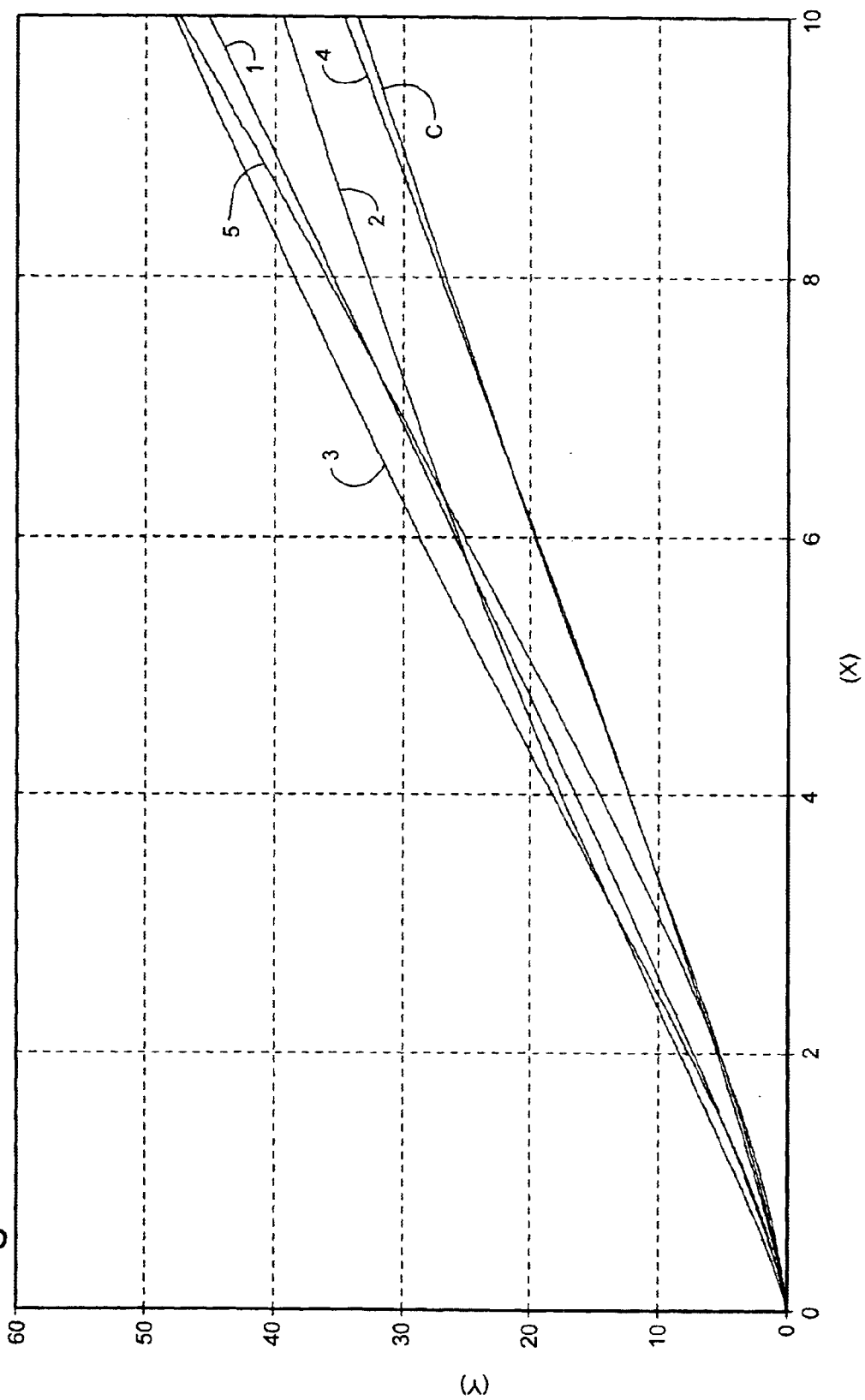
FIG. 2 is a graph illustrating cumulative energy absorption (N-mm), y axis, as a function of crack opening displacement, x axis.

The results of the tests are set out in Table 2 and FIGS. 1 and 2. FIG. 1 illustrates load (N), y axis, as a function of averaged load-crack opening displacement, x axis. (Curves identified by sample number). FIG. 2 illustrates cumulative energy absorption (N-mm), y axis, as a function of crack opening displacement, x axis. (Curves identified by sample number.)

TABLE 2

| | Peak Load (N) | Average Bond Strength (kPa) | % Improvement Over Control | Cumulative Energy Absorbed to 10 mm Slip (N-mm) | % Improvement Over Control |
|---|---|---|---|---|---|
| CONTROL | 3.8 | 721 | — | 33.5 | — |
| 1 | 5.0 | 948 | 32 | 45.1 | 35 |
| 2 | 4.8 | 910 | 26 | 39.4 | 18 |
| 3 | 5.5 | 1043 | 45 | 47.8 | 43 |
| 4 | 4.0 | 759 | 5 | 34.6 | 3 |
| 5 | 5.9 | 1119 | 55 | 47.4 | 41 |

The present invention may be embodied in other forms without departing from the spirit and the essential attributes thereof, and, accordingly, reference should be made to the appended claims, rather than to the foregoing specification, as indicated the scope of the invention.

What is claimed is:

1. A fiber reinforced cementitious material comprises:

a cementitious material and less than 5 pounds per cubic yard of said cementitious material of fibers dispersed therein, the fibers comprising a mixture of a thermoplastic polymer and an organometal compound wherein the metal of said compound being selected from the group consisting of Ti, Si, Zr, Al, and combinations thereof, and said organometal compound comprising less than 10% by weight of said fibers.

2. The fiber reinforced cementitious material of claim 1 wherein said organometal compound comprises less than 5% by weight of said fibers.

3. The fiber reinforced cementitious material of claim 1 wherein said organometal compounds being selected from the group consisting of titanates, silanes, zirconates, aluminates, and combinations thereof.

4. The fiber reinforced cementitious material of claim 1 wherein said organometal compounds being a silane and another organometal compound being selected from the group consisting of titanates, zirconates, aluminates, and combinations thereof.

5. The fiber reinforced cementitious material of claim 1 wherein said organometal compounds being a silane and a titanate.

6. The fiber reinforced cementitious material of claim 1 wherein said organometal compounds being a silane and a zirconate.

7. The fiber reinforced cementitious material of claim 1 wherein said organometal compounds being a silane.

8. The fiber reinforced cementitious material of claim 1 wherein said thermoplastic polymer being selected from the group consisting of polyolefins, polyesters, nylons, acrylics.

9. The fiber reinforced cementitious material of claim 8 wherein said thermoplastic polymer being a polypropylene.

10. The fiber reinforced cementitious material of claim 1 wherein said fiber being a chopped fiber.

11. The fiber reinforced cementitious material of claim 1 wherein said fibers being randomly dispersed.

12. The fiber reinforced cementitious material of claim 1 wherein said fibers being dispersed in aligned patterns.

* * * * *